United States Patent
Xu et al.

(10) Patent No.: US 10,429,975 B2
(45) Date of Patent: Oct. 1, 2019

(54) TOUCH PANEL, DISPLAY DEVICE AND MANUFACTURING METHOD OF TOUCH PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jiawei Xu, Beijing (CN); Lei Zhang, Beijing (CN); Tsung Chieh Kuo, Beijing (CN); Qingpu Wang, Beijing (CN); Xiaoyue He, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/742,774

(22) PCT Filed: Jul. 14, 2017

(86) PCT No.: PCT/CN2017/092972
§ 371 (c)(1),
(2) Date: Jan. 8, 2018

(87) PCT Pub. No.: WO2018/036301
PCT Pub. Date: Mar. 1, 2018

(65) Prior Publication Data
US 2018/0373369 A1    Dec. 27, 2018

(30) Foreign Application Priority Data
Aug. 25, 2016    (CN) .......................... 2016 1 0725053

(51) Int. Cl.
G06F 3/041    (2006.01)
G06F 3/044    (2006.01)

(52) U.S. Cl.
CPC ............ G06F 3/0412 (2013.01); G06F 3/044 (2013.01); G06F 2203/04107 (2013.01); G06F 2203/04111 (2013.01); G06F 2203/04112 (2013.01)

(58) Field of Classification Search
CPC .................. G06F 3/0412; G06F 3/044; G06F 2203/04107; G06F 2203/04111
See application file for complete search history.

(56) References Cited

U.S. PATENT DOCUMENTS

2014/0071064 A1    3/2014    Cho
2014/0368755 A1    12/2014   Chen et al.
2017/0262091 A1    9/2017    Wang et al.

FOREIGN PATENT DOCUMENTS

CN    103677461 A    3/2014
CN    104391389 A    3/2015
(Continued)

OTHER PUBLICATIONS

International Search Report and Written Opinion dated Oct. 24, 2017; PCT/CN2017/092972.

*Primary Examiner* — Peter D McLoone

(57) ABSTRACT

A touch panel, a display device and a manufacturing method of the touch panel are provided. The touch panel includes: a first electrode layer and a second electrode layer configured to sense a touch; an insulating layer located between the first electrode layer and the second electrode layer; a first ground wire disposed on a side of the insulating layer facing the first electrode layer; and a second ground wire disposed on a side of the insulating layer facing the second electrode layer. The first ground wire or the second ground wire is electrically connected with a grounding terminal. The insulating layer is (Continued)

provided with a ground wire vias through which the first ground wire and the second ground wire are electrically connected with each other.

13 Claims, 3 Drawing Sheets

(56) References Cited

FOREIGN PATENT DOCUMENTS

| | | |
|---|---|---|
| CN | 204270269 U | 4/2015 |
| CN | 105824461 A | 8/2016 |
| CN | 106325601 A | 1/2017 |
| CN | 206133506 U | 4/2017 |

TOUCH PANEL, DISPLAY DEVICE AND MANUFACTURING METHOD OF TOUCH PANEL

CROSS REFERENCE TO RELATED APPLICATIONS

The present application claims priority of the Chinese patent application No. 201610725053.9 titled "Touch panel, Display Device and Manufacturing Method of Touch panel" filed with SIPO on Aug. 25, 2016, which is incorporated herein by reference in its entirety.

TECHNICAL FIELD

Embodiments of the present disclosure relate to a touch panel, a display device and a manufacturing method of the touch panel.

BACKGROUND

Touch panels are external input devices applied widely and increasingly, which implements input by a simple touch by a finger and allows the man-machine interaction process to be directly performed, and has features of simple, fast and humanization.

SUMMARY

Embodiments of the present disclosure relates to a touch panel, a display device, and a manufacturing method of the touch panel.

According to at least one embodiment of the present disclosure, a touch panel is provided. The touch panel comprises: a first electrode layer and a second electrode layer configured to sense a touch and an insulating layer located between the first electrode layer and the second electrode layer; a first ground wire disposed on a side of the insulating layer facing the first electrode layer; and a second ground wire disposed on a side of the insulating layer facing the second electrode layer. The first ground wire or the second ground wire is electrically connected with a grounding terminal; and the insulating layer is provided with a ground wire vias through which the first ground wire and the second ground wire are electrically connected with each other.

For example, the touch panel also comprises: a display area and a black matrix region surrounding the display area. The first electrode layer and the second electrode layer are located in the display area; and the first ground wire and the second ground wire are disposed along the black matrix region.

For example, the first electrode layer comprises a lateral touch electrode and a longitudinal touch electrode; and the second electrode layer comprises an electrode bridge point configured to bridge the lateral touch electrode and the longitudinal touch electrode at an intersection.

For example, the touch panel also comprises: a metal wiring disposed on the side of the insulating layer facing the first electrode layer and configured to electrically connect the lateral touch electrode and the longitudinal touch electrode with a driving chip. The first ground wire and the metal wiring are disposed in a same layer, and the first ground wire includes a material same as that of the metal wiring.

For example, the second ground wire and the second electrode layer are disposed in a same layer and the second ground wire includes a material same as that of the second electrode layer.

For example, the material of the first electrode layer is indium tin oxide; and the material of the second electrode layer is indium tin oxide.

For example, the first electrode layer comprises a lateral touch electrode; and the second electrode layer comprises a longitudinal touch electrode.

For example, the first ground wire includes a material same as that of the first electrode layer, and the first ground wire is disposed in a same layer as the first electrode layer.

For example, the second ground wire includes a material same as that of the second electrode layer, and the second ground wire and the second electrode layer are disposed in a same layer.

According to embodiments of the present disclosure, a display device is provided, comprising the touch panel.

According to embodiments of the present disclosure, a manufacturing method of a touch panel is provided, comprising: forming a first electrode layer and a first ground wire on a substrate; forming an insulating layer on the first electrode layer and the first ground wire, the insulating layer being provided with a ground wire vias; and forming a second electrode layer and a second ground wire on the insulating layer. The first ground wire, or the second ground wire is electrically connected with a grounding terminal, and the first ground wire and the second ground wire are electrically connected with each other through the ground wire vias of the insulating layer.

For example, the substrate comprises a display area and a black matrix region surrounding the display area. The first electrode layer and the second electrode layer are formed in the display area; and the first ground wire and the second ground wire are formed in the black matrix region.

For example, the first electrode layer comprises a lateral touch electrode and a longitudinal touch electrode; and the second electrode layer comprises an electrode bridge point configured to bridge the lateral touch electrode and the longitudinal touch electrode at an intersection. The manufacturing method also comprises: depositing a transparent electrode layer on the substrate and forming patterns of the lateral touch electrode and the longitudinal touch electrode by a patterning process; depositing a metal layer on the substrate and forming patterns of the first ground wire and the metal wiring by a patterning process. The metal wiring electrically connects the lateral touch electrode and the longitudinal touch electrode with a driving chip. The manufacturing method also comprises depositing a transparent electrode layer on the insulating layer and forming patterns of the electrode bridge point and the second ground wire by a patterning process.

For example, the second electrode layer comprises a lateral touch electrode and a longitudinal touch electrode; and the first electrode layer comprises an electrode bridge point configured to bridge the lateral touch electrode and the longitudinal touch electrode at an intersection. The manufacturing method also comprises: depositing a transparent electrode layer on the substrate and forming patterns of the electrode bridge point and the first ground wire by a patterning process. The manufacturing method also comprises: depositing a transparent electrode layer on the insulating layer and forming patterns of the lateral touch electrode and the longitudinal touch electrode by a patterning process; and depositing a metal layer on the insulating layer and forming patterns of the second ground wire and the metal wiring by a patterning process. The metal wiring electrically connects the lateral touch electrode and the longitudinal touch electrode with a driving chip.

For example, the first electrode layer comprises a lateral touch electrode, and the second electrode layer comprises a longitudinal touch electrode. The manufacturing method also comprises: depositing a first electrode layer on the substrate and forming patterns of the lateral touch electrode and the first ground wire by a patterning process; and depositing a second electrode layer on the insulating layer and forming patterns of the longitudinal touch electrode and the second ground wire by a patterning process.

BRIEF DESCRIPTION OF THE DRAWINGS

Embodiments of the present disclosure will be described in more detail below with reference to accompanying drawings to allow an ordinary skill in the art to more clearly understand embodiments of the present disclosure, in which.

DETAILED DESCRIPTION

Figure 1:
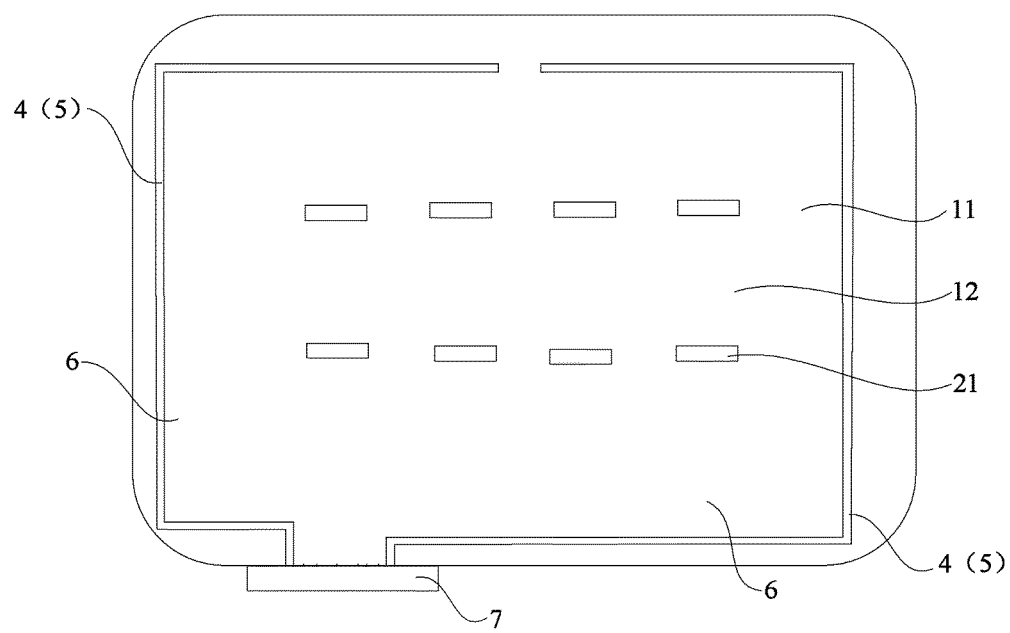
FIG. 1 is a schematically structural diagram of a touch panel provided in an embodiment of the present disclosure.

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

The inventors noticed that the touch panels suffer more and more the electrostatic (ESD) affect with the extension of application fields of touch panels and the popularity of large size touch panels. For example, the touch panels in the art have no effective protection ways against the generation of the inductive electrostatic and releasing of electrostatic accumulation during the manufacturing process, structures, such as sensing electrodes, and metal wirings in touch panels, are susceptible to poor electrostatic induction. And the light blocking structure in the black matrix region in the touch panels in the art consists of carbon wrapped in resin layer, when electrostatic induction currents are generated in metal wirings or sensing electrode paths of the black matrix region, the resin layer of the light blocking structure tends to be electrically broken down such that the light blocking structure forms a conducting path, resulting in problems, such as higher analog-to-digital converter (ADC) on electrical side edge, and short circuiting between the transmitting electrode and the receiving electrode (Tx&Rx short).

As shown in FIGS. 1-4, a touch panel provided in an embodiment of the present disclosure includes a first electrode layer 1 and a second electrode layer 2 for sensing touch, and an insulating layer 3 located between the first electrode layer 1 and the second electrode layer 2. The touch panel also includes a first ground wire 4 disposed on a side of the insulating layer 3 facing the first electrode layer 1 and a second ground wire 5 disposed on a side of the insulating layer 3 facing the second electrode layer 2. The first ground wire 4 is electrically connected with the grounding terminal and/or the second ground wire 5 is electrically connected with the grounding terminal. The insulating layer 3 is provided with a ground wire vias 31 through which the first ground wire 4 and the second ground wire 5 are electrically connected with each other.

In the touch panel, the first ground wire 4 and the second ground wire 5 are respectively disposed in the two layers of electrode layer (the first electrode layer 1 and the second electrode layer 2) structure for touch sensing, and the first ground wire 4 and/or the second ground wire 5 are electrically connected with the grounding terminal. The first ground wire 4 and the second ground wire 5 can serve as an electrostatic shielding for the two electrode layers to avoid interference from external charges. In addition, the first ground wire 4 and the second ground wire 5 can conduct static electricity generated in the two electrode layers out in time to avoid poor sensing of touch due to electrostatic accumulation and releasing. In this way, the touch panel can avoid poor yield due to electrostatic (ESD).

As shown in FIG. 1, in an exemplary embodiment, the touch panel may include a display area and a black matrix region surrounding the display area. The first electrode layer 1 and second electrode layer 2 are located in the display area, and the first ground wire 4 and second ground wire 5 are arranged along the black matrix region. For example, the first ground wire 4 and second ground wire 5 may be strip structures extending along the black matrix region.

The first ground wire 4 and the second ground wire 5 extend along the black matrix region, that is, the first ground wire 4 and the second ground wire 5 enclose the first electrode layer 1 and the second electrode layer 2 such that the first ground wire 4 and the second ground wire 5 may effectively shield the first electrode layer 1 and the second electrode layer 2. In this way, it is possible to effectively avoid interference to the first electrode layer 1 and the second electrode layer 2 by external charges. Furthermore, the first ground wire 4 and the second ground wire 5 may conduct static electricity generated around the first electrode layer 1 and the second electrode layer 2 out in time, which can effectively avoid electrostatic accumulation and effectively avoid poor sensing of touch due to electrostatic discharge. In addition, the first ground wire 4 and the second ground wire 5 are disposed along the black matrix region, so that they are not likely to contact and short with the first electrode layer 1 and the second electrode layer 2, and will not affect the display area due to light blocking, for example.

Figure 2:
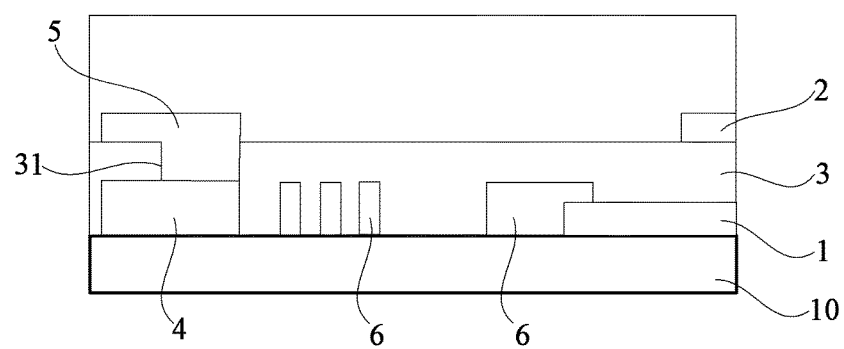
FIG. 2 is a part of a schematically structural view of a touch panel provided in an embodiment of the present disclosure.

In embodiment I, as shown in FIGS. 1 and 2, the touch panel may be an OGS (One Glass Solution) structure. For example, in the touch panel of the present embodiment, the first electrode layer 1 may include a lateral touch electrode 11 and a longitudinal touch electrode 12; and the second electrode layer 2 may include an electrode bridge point 21 configured to bridge the lateral touch electrode 11 and the longitudinal touch electrode 12 at their intersection. As shown in FIG. 1, the electrode bridge point 21 may be a bridging structure disposed at the intersection and configured to connect the longitudinal touch electrode 12.

As shown in FIG. 1 and FIG. 2, in an example, in the touch panel, both of materials of the first electrode layer 1 and the second electrode layer 2 are a transparent electrode material. For example, both the first electrode layer 1 and the second electrode layer 2 are an indium tin oxide (ITO) material layer.

As shown in FIG. 1 and FIG. 2, in an example, the touch panel may also include a metal wiring 6 disposed on a side of the insulating layer 3 facing the first electrode layer 1 and configured to electrically connect the lateral touch electrode 11 and the longitudinal touch electrode 12 with the driving chip 7.

As shown in FIG. 2, for example, the first ground wire 4 may be disposed in the same layer as the metal wiring 6, and the material of the first ground wire 4 may be the same as that of the metal wiring 6. The first ground wire 4 and the metal wiring 6 may be prepared in a same patterning process, which can simplify the manufacturing process of the touch panel.

As shown in FIG. 1, for example, the first ground wire 4 may be electrically connected with the driving chip 7, so as to be electrically connected with the grounding terminal.

As shown in FIG. 2, in an example, the second ground wire 5 may be disposed in a same layer as the second electrode layer 2, and the material of the second ground wire 5 may also be the same as that of the second electrode layer 2. The second ground wire 5 and the second electrode layer 2 may be prepared in a same patterning process, and the manufacturing process of the touch panel can be simplified.

Figure 4:
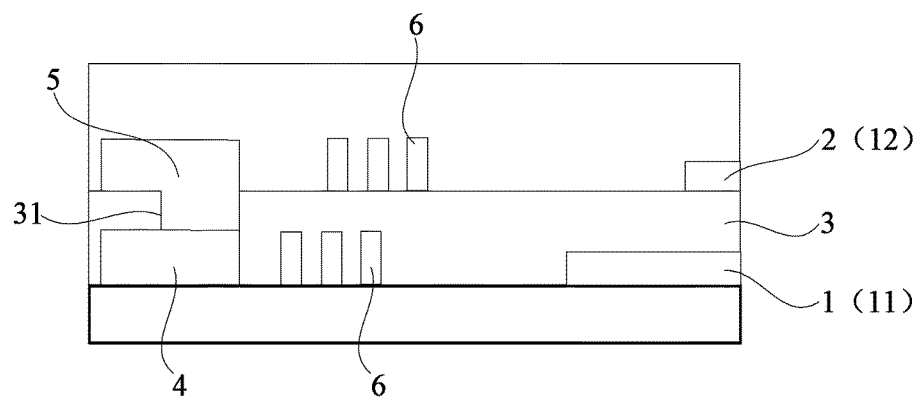
FIG. 4 is a part of a schematically structural view of a touch panel provided in yet another embodiment of the present disclosure.

In the embodiment II, as shown in FIG. 4, in the touch panel of the present embodiment, the first electrode layer 1 may include a lateral touch electrode 11; and the second electrode layer 2 may include a longitudinal touch electrode 12.

As shown in FIG. 4, in an example, the touch panel may be a metal mesh structure. For example, both of the materials of the first electrode layer 1 and the second electrode layer 2 are a metal, and the lateral touch electrode 11 and the longitudinal touch electrode 12 are metal mesh electrodes.

As shown in FIG. 4, in an example, the material of the first ground wire 4 may be the same as that of the first electrode layer 1, and the first ground wire 4 may be disposed in the same layer as the first electrode layer 1. The first ground wire 4 and the first electrode layer 1 may be prepared in a same patterning process, and the manufacturing process of the touch panel can be simplified.

For example, the material of the second ground wire 5 may be the same as that of the second electrode layer 2, and the second ground wire 5 may be disposed in a same layer as the second electrode layer 2. The second ground wire 5 and the second electrode layer 2 may be prepared in a same patterning process, and the manufacturing process of the touch panel can be simplified.

As shown in FIG. 4, in another example, both of the materials of the first electrode layer 1 and the second electrode layer 2 may be a transparent electrode material. For example, both the lateral touch electrode 11 and the longitudinal touch electrode 12 may be an ITO electrode.

As shown in FIG. 4, in an example, the material of the first ground wire 4 may the same as that of the metal wiring of the lateral touch electrode 11 and disposed in a same layer as the metal wiring. The material of the second ground wire 5 may be the same as that of the metal wiring of the longitudinal touch electrode and disposed in a same layer as the metal wiring.

For example, in the lateral touch electrode 11 and the longitudinal touch electrode 12 in the various embodiments, it is possible that the lateral touch electrode 11 is the transmitting electrode, and the longitudinal touch electrode 12 is the sensing electrode; or the lateral touch electrode 11 is the sensing electrode and the longitudinal touch electrode 12 is the transmitting electrode.

An embodiment of the present disclosure also provides a display device that includes the touch panel in any one of the embodiments. The touch panel in the display device in the embodiment of the present disclosure may avoid defectiveness due to electrostatic (ESD) effect, in this way, the display device in the embodiment of the present disclosure has better touch sensing performance and higher reliability.

Figure 5:
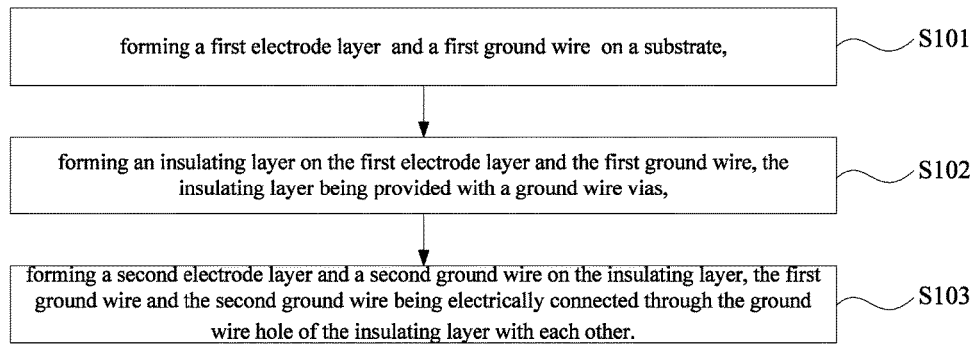
FIG. 5 is a flow chart of a method for manufacturing a touch panel provided in an embodiment of the present disclosure.

An embodiment of the present disclosure also provides a manufacturing method for a touch panel, as shown in FIG. 5 in conjunction with FIGS. 1-4, which includes steps of: step S101, forming a first electrode layer 1 and a first ground wire 4 on a substrate 10; step S102, forming an insulating layer 3 on the first electrode layer 1 and the first ground wire 4, the insulating layer 3 being provided with a ground wire vias 31; and step S103, forming a second electrode layer 2 and a second ground wire 5 on the insulating layer 3.

The first ground wire 4 is electrically connected with the grounding terminal; or the second ground wire 5 is electrically connected with the grounding terminal; or the first ground wire 4 and the second ground wire 5 are electrically connected through the ground wire vias 31 of the insulating layer 3.

In the touch panel formed by the manufacturing method, the first ground wire 4 and the second ground wire 5 are disposed in the two layers of the electrode layer (the first electrode layer 1 and the second electrode layer 2) structure for touch sensing, respectively, and the first ground wire 4 and the second ground wire 5 are both electrically connected with the grounding terminal. In this way, the first ground wire 4 and the second ground wire 5 may serve as an electrostatic shield for the two electrode layers to avoid interference from external charges. In addition, the first ground wire 4 and the second ground wire 5 may conduct static electricity generated in the two electrode layers out in time to avoid poor touch sensing due to electrostatic accumulation and releasing. In this way, the touch panel may avoid defectiveness due to electrostatic (ESD) effect.

Referring to FIG. 1, in an example, the touch panel may include a display area and a black matrix region surrounding the display area. The first electrode layer 1 and the second electrode layer 2 are located in the display area. The first ground wire 4 and the second ground wire 5 are disposed along the black matrix region. For example, the first ground wire 4 and second ground wire 5 can be strip structures extending along the black matrix region.

The first ground wire 4 and the second ground wire 5 extend along the black matrix region, that is, the first ground wire 4 and the second ground wire 5 enclose the first electrode layer 1 and the second electrode layer 2, such that the first ground wire 4 and the second ground wire 5 may effectively shield the first electrode layer 1 and the second electrode layer 2 in which way it is possible to effectively avoid interference with the first electrode layer 1 and the second electrode layer 2 by external charges. Furthermore, the first ground wire 4 and the second ground wire 5 may conduct static electricity generated around the first electrode layer 1 and the second electrode layer 2 out in time, which effectively avoid electrostatic accumulation and may effectively avoid poor sensing of touch due to electrostatic discharge. In addition, the first ground wire 4 and the second ground wire 5 are disposed along the black matrix region, in this way, they are not likely to contact and short with the first electrode layer 1 and the second electrode layer 2, and will not affect the display area due to light blocking, for example.

In embodiment I, as shown in FIGS. 1 and 2, in the touch panel formed by the manufacturing method of the present embodiment, the first electrode layer 1 includes a lateral touch electrode 11 and a longitudinal touch electrode 12; and the second electrode layer 2 includes an electrode bridge point 21 configured to bridge the lateral touch electrode 11 and the longitudinal touch electrode 12 at the intersection. As shown in FIG. 1, the electrode bridge point 12 may be a bridging structure disposed at the intersection and configured to connect the longitudinal touch electrodes 12.

As shown in FIGS. 1, 2 and 5, in an example, in the manufacturing method of the touch panel, step S101, namely the step of forming the first electrode layer 1 and the first ground wire 4 on the substrate 10 may comprise: for example, depositing a transparent electrode layer, such as ITO layer, on the substrate 10, and forming patterns of the lateral touch electrode 11 and the longitudinal touch electrode 12 by a patterning process; and depositing a metal layer on the substrate 10, and forming patterns of the first ground wire 4 and the metal wiring 6 by a patterning process. The metal wiring 6 electrically connects the lateral touch electrode 11 and the longitudinal touch electrode 12 with the driving chip 7, respectively.

For example, the first ground wire 4 is electrically connected with the driving chip 7, which realizes the electrical connection with the grounding terminal.

The step S102, namely the step of forming the second electrode layer 2 and the second ground wire 5 on the insulating layer 10 may include: for example, depositing a transparent electrode layer, such as ITO layer, on the insulating layer 3, and forming patterns of the electrode bridge point 21 and the second ground wire 5 by a patterning process.

In the manufacturing method of the touch panel in the present embodiment, the first ground wire 4, and metal wirings 6 of the sensing electrodes (the lateral touch electrode 11 and the longitudinal touch electrode 12) are formed by a same patterning process; and the second ground wire 5, and the second electrode layer 2 are formed by a same patterning process. In this way, no additional process steps need to be added for the preparing process of the first ground wire 4 and the second ground wire 5. In this way, the manufacturing process of the manufacturing method of the touch panel is simplified.

Figure 3:
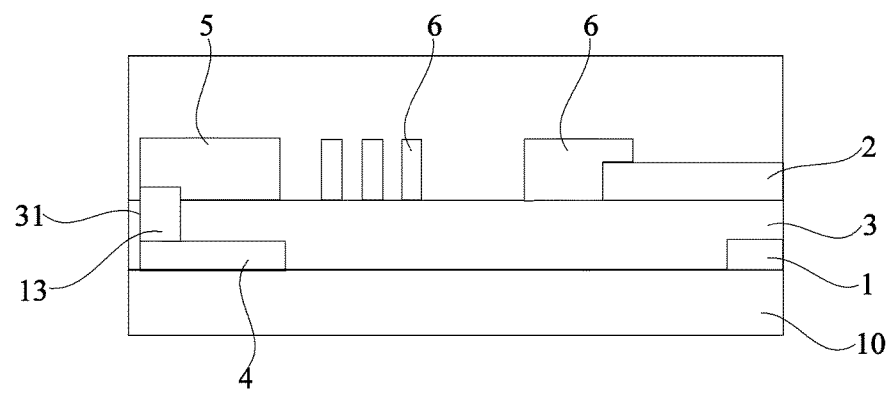
FIG. 3 is a part of a schematically structural view of a touch panel provided in another embodiment of the present disclosure.

In embodiment II, as shown in FIGS. 1 and 3, in the touch panel formed by the manufacturing method of the present embodiment, the second electrode layer 2 includes a lateral touch electrode 11 and a longitudinal touch electrode 12; and the first electrode layer 1 includes an electrode bridge point 21 configured to bridge the lateral touch electrode 11 and the longitudinal touch electrode 12 at the intersection.

As shown in FIGS. 1, 3 and 5, in an example, in the manufacturing method of the touch panel of the present embodiment, step S101, namely the step of forming the first electrode layer 1 and the first ground wire 4 on the substrate 10 may comprise: for example, depositing a transparent electrode layer, such as ITO layer, on the substrate 10, and forming patterns of the electrode bridge point 21 and the first ground wire 4 by a patterning process.

The step S102, namely the step of forming the second electrode layer 2 and the second ground wire 5 on the insulating layer 3 may include: for example, depositing a transparent electrode layer, such as ITO layer, on the insulating layer 3, and forming patterns of the lateral touch electrode 11 and the longitudinal touch electrode 12 by a patterning process; and depositing a metal layer on the insulating layer 3, and forming patterns of the second ground wire 5 and the metal wiring 6 by a patterning process. The metal wiring 6 electrically connects the lateral touch electrode 11 and the longitudinal touch electrode 12 with the driving chip 7.

For example, the second ground wire 5 is electrically connected with the driving chip 7, which realizes the electrical connection with the grounding terminal.

For example, as shown in FIG. 3, the process of patterning the transparent electrode layer to form patterns of the lateral touch electrodes 11 and the longitudinal touch electrodes 12 may simultaneously form the lapping section 13 in the ground wire vias 31 of the insulating layer 3. The lapping section 13 is electrically connected with the first ground wire 4 through the ground wire vias 31. In this way, it is possible to implement the electrical connection between the first ground wire 4 and the second ground wire 5 by connecting the second ground wire 5 on the insulating layer 3 with the lapping section 13.

In the manufacturing method of the touch panel in the present embodiment, the first ground wire 4 and the first electrode layer 1 are formed by a same patterning process, and the second ground wire 5 and metal wirings 6 of the sensing electrodes (the lateral touch electrode 11 and the longitudinal touch electrode 12) are formed by a same patterning process. In this way, no additional process steps need to be added for the preparing process of the first ground wire 4 and the second ground wire 5. The manufacturing process of the manufacturing method of the touch panel is simplified.

In embodiment III, as shown in FIGS. 4 and 5, in the touch panel formed by the manufacturing method of the present embodiment, the first electrode layer 1 includes a lateral touch electrode 11; and the second electrode layer 2 includes a longitudinal touch electrode 12.

As shown in FIGS. 4 and 5, in an example, in the manufacturing method of the touch panel, step S101, namely the step of forming the first electrode layer 1 and the first ground wire 4 on the substrate 10 may comprise: for example, depositing an electrode layer on the substrate 10, and forming patterns of the lateral touch electrode 11 and the first ground wire 4 by a patterning process. For example, the electrode layer may be a metal layer. For example, the lateral touch electrode 11 is a metal mesh electrode. The electrode layer may also be a transparent electrode layer. For example, the lateral touch electrode 11 may be an ITO electrode.

The step S102, namely the step of forming the second electrode layer 2 and the second ground wire 5 on the insulating layer 3 may include: for example, depositing an electrode layer on the insulating layer 3, and forming patterns of the longitudinal touch electrode 12 and the second ground wire 5 by a patterning process. For example, the electrode layer may be a metal layer. For example, the longitudinal touch electrode 12 is a metal mesh electrode. The electrode layer may be a transparent electrode layer. For example, the longitudinal touch electrode 12 may be an ITO electrode.

It is to be noted that the embodiments are only illustrations of the touch panel manufacturing method of the embodiment of the present disclosure, and the manufacturing method of the embodiments of the present disclosure is not limited to the embodiments.

The described above are only exemplary embodiments of the present disclosure, and the present disclosure is not intended to be limited thereto. For one of ordinary skill in the art, various changes and alternations may be readily contemplated without departing from the technical scope of the present disclosure, and all of these changes and alternations shall fall within the scope of the present disclosure.

What is claimed is:

1. A touch panel, comprising,
a first electrode layer and a second electrode layer configured to sense touch and an insulating layer located between the first electrode layer and the second electrode layer;
a first ground wire disposed on a side of the insulating layer facing the first electrode layer, the first ground wire and the first electrode layer being including same material and provided in a same layer; and
a second ground wire disposed on a side of the insulating layer facing the second electrode layer, the second ground wire and the second electrode layer including same material and provided in a same layer;
wherein the first ground wire or the second ground wire are electrically connected with a grounding terminal; and the insulating layer is provided with a ground wire vias through which the first ground wire and the second ground wire are electrically connected with each other.

2. The touch panel according to claim 1, further comprising, a display area and a black matrix region surrounding the display area;
wherein the first electrode layer and the second electrode layer are located in the display area; and
the first ground wire and the second ground wire are disposed along the black matrix region.

3. The touch panel according to claim 2, wherein
the first electrode layer comprises a lateral touch electrode and a longitudinal touch electrode; and
the second electrode layer comprises an electrode bridge point configured to bridge the lateral touch electrode and the longitudinal touch electrode at an intersection.

4. The touch panel according to claim 3, further comprising, a metal wiring disposed on the side of the insulating layer facing the first electrode layer and configured to electrically connect the lateral touch electrode and the longitudinal touch electrode with a driving chip.

5. The touch panel according to claim 2, wherein
the first electrode layer comprises a lateral touch electrode; and
the second electrode layer comprises a longitudinal touch electrode.

6. The touch panel according to claim 1, wherein the first electrode layer includes a material which is indium tin oxide; and the second electrode layer includes a material which is indium tin oxide.

7. The touch panel according to claim 1, wherein
the first electrode layer comprises a lateral touch electrode and a longitudinal touch electrode; and
the second electrode layer comprises an electrode bridge point configured to bridge the lateral touch electrode and the longitudinal touch electrode at an intersection.

8. A display device, comprising a touch panel, wherein the touch panel comprises,
a first electrode layer and a second electrode layer configured to sense touch and an insulating layer located between the first electrode layer and the second electrode layer;
a first ground wire disposed on a side of the insulating layer facing the first electrode layer, the first ground wire and the first electrode layer being including same material and provided in a same layer; and
a second ground wire disposed on a side of the insulating layer facing the second electrode layer, the second ground wire and the second electrode layer including same material and provided in a same layer;
wherein the first ground wire or the second ground wire are electrically connected with a grounding terminal; and the insulating layer is provided with a ground wire vias through which the first ground wire and the second ground wire are electrically connected with each other.

9. A manufacturing method of a touch panel, comprising:
forming a first electrode layer and a first ground wire by a same material in a same layer on a substrate;
forming an insulating layer on the first electrode layer and the first ground wire, the insulating layer being provided with a ground wire vias; and
forming a second electrode layer and a second ground wire on the insulating layer by a same material in a same layer; wherein the first ground wire or the second ground wire is electrically connected with a grounding terminal, and the first ground wire and the second ground wire are electrically connected with each other through the ground wire vias of the insulating layer.

10. The manufacturing method of the touch panel according to claim 9, wherein the substrate comprises a display area and a black matrix region surrounding the display area;
wherein the first electrode layer and the second electrode layer are formed in the display area; and
the first ground wire and the second ground wire are formed in the black matrix region.

11. The manufacturing method of the touch panel according to claim 10, wherein the first electrode layer comprises a lateral touch electrode and a longitudinal touch electrode; and the second electrode layer comprises an electrode bridge point configured to bridge the lateral touch electrode and the longitudinal touch electrode at an intersection;
the manufacturing method further comprises:
depositing a transparent electrode layer on the substrate and forming patterns of the lateral touch electrode and the longitudinal touch electrode by a patterning process;
depositing a metal layer on the substrate and forming patterns of the first ground wire and the metal wiring by a patterning process, wherein the metal wiring electrically connects the lateral touch electrode and the longitudinal touch electrode with a driving chip; and
depositing a transparent electrode layer on the insulating layer and forming patterns of the electrode bridge point and the second ground wire by a patterning process.

12. The manufacturing method of the touch panel according to claim 10, wherein the second electrode layer comprises a lateral touch electrode and a longitudinal touch electrode; the first electrode layer comprises an electrode bridge point configured to bridge the lateral touch electrode and the longitudinal touch electrode at an intersection;
the manufacturing method further comprises:
depositing a transparent electrode layer on the substrate and forming patterns of the electrode bridge point and the first ground wire by a patterning process; and
depositing a transparent electrode layer on the insulating layer and forming patterns of the lateral touch electrode and the longitudinal touch electrode by a patterning process; and
depositing a metal layer on the insulating layer and forming patterns of the second ground wire and the metal wiring by a patterning process, wherein the metal wiring electrically connects the lateral touch electrode and the longitudinal touch electrode with a driving chip.

13. The manufacturing method of the touch panel according to claim 10, wherein the first electrode layer comprises a lateral touch electrode and the second electrode layer comprises a longitudinal touch electrode;

the manufacturing method further comprises:

depositing a first electrode layer on the substrate and forming patterns of the lateral touch electrode and the first ground wire by a patterning process; and depositing a second electrode layer on the insulating layer and forming patterns of the longitudinal touch electrode and the second ground wire by a patterning process.

* * * * *